(12) United States Patent
Kitagawa et al.

(10) Patent No.: US 9,308,587 B2
(45) Date of Patent: Apr. 12, 2016

(54) CUTTING TOOL FOR BORING

(75) Inventors: Shusuke Kitagawa, Aichi (JP); Kenji Isobe, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 838 days.

(21) Appl. No.: 13/075,215

(22) Filed: Mar. 30, 2011

(65) Prior Publication Data

US 2011/0243674 A1 Oct. 6, 2011

(30) Foreign Application Priority Data

Mar. 31, 2010 (JP) ................................. 2010-083025
Feb. 11, 2011 (JP) ................................. 2011-027989

(51) Int. Cl.
*B23B 29/02* (2006.01)
*B23B 27/00* (2006.01)

(52) U.S. Cl.
CPC ............... *B23B 27/007* (2013.01); *B23B 29/02* (2013.01); *B23B 2270/30* (2013.01); *Y10T 408/89* (2015.01); *Y10T 408/892* (2015.01); *Y10T 408/907* (2015.01)

(58) Field of Classification Search
CPC ...... B23B 29/02; B23B 27/007; Y10T 408/89
USPC ........... 407/100, 102–104; 408/226, 199, 200
See application file for complete search history.

(56) References Cited

U.S. PATENT DOCUMENTS

| 3,027,786 | A | * | 4/1962 | Severson | 408/197 |
| 3,963,366 | A | * | 6/1976 | Eckle et al. | 408/199 |
| 5,261,767 | A | * | 11/1993 | Tsujimura et al. | 408/187 |
| 6,126,365 | A | * | 10/2000 | Okawa et al. | 407/66 |
| 2004/0052592 | A1 | * | 3/2004 | Oettle | 407/117 |
| 2011/0097167 | A1 | | 4/2011 | Inoue et al. | |

FOREIGN PATENT DOCUMENTS

| EP | 0405443 A1 * | 1/1991 | B23B 27/00 |
| EP | 1806191 A2 * | 7/2007 | B23B 27/00 |
| JP | 2002-166305 A * | 6/2002 | B23B 27/00 |
| JP | 2005-279855 A | 10/2005 | |

(Continued)

OTHER PUBLICATIONS

Communication dated Aug. 28, 2012 from the Japanese Patent Office in counterpart Japanese application No. 2011-027989.

*Primary Examiner* — Sunil K Singh
*Assistant Examiner* — Ryan Rufo
(74) *Attorney, Agent, or Firm* — Sughrue Mion, PLLC

(57) ABSTRACT

A cutting tool for boring including a cutting insert fixed at a front end of a bar-shaped holder. The holder includes a cutting surface-sided chip pocket that is concave with respect to the outer circumferential surface of the holder, the cutting edge end of the cutting insert protruding from the outer circumferential surface of the holder, and the cutting surface-sided chip pocket having a bottom surface facing the portion of outer circumferential surface where the cutting edge overhangs. Further, an cutting edge-sided chip pocket is formed at the portion of outer circumferential surface where the cutting edge overhangs such that the edge of the portion of outer circumferential surface where the cutting edge overhangs is concave with respect to the outer circumferential surface of the holder, on the bottom of the cutting surface-sided chip pocket when viewed from the cutting surface.

8 Claims, 14 Drawing Sheets

(56) References Cited

FOREIGN PATENT DOCUMENTS

| JP | 2006-062056 A | * | 3/2006 | ............ B23B 27/00 |
| JP | 2007-185765 A | * | 7/2007 | ............ B23B 27/10 |
| JP | 2007-320013 A | * | 12/2007 | ............ B23B 27/00 |
| WO | 2009157540 A1 | | 12/2009 | |

* cited by examiner

CUTTING TOOL FOR BORING

BACKGROUND OF THE INVENTION

1. Field of the Invention

The present disclosure relates to a cutting tool for boring, and more particularly, to a cutting tool for boring (also called a boring bit) which is used for turning the inner circumferential surface of a hole having a circular cross-section, or the inner circumferential surface of a cylindrical pipe, particularly for machining a deep small-diameter hole.

2. Description of the Related Art

Cutting tools for boring are used to machine the inner circumferential surface of a hole of a workpiece (an object to be cut), such that the cutting edge (the front end of a cutting edge for cutting) of a cutting insert (for example, a throw-away type cutting insert) fixed to the front end of a bar-shaped holder overhangs from a side of the outer circumferential surface of the holder. In the cutting tool for boring (hereinafter, also referred to as a cutting tool), when the diameter of the inner circumferential surface of a hole of a workpiece (hereinafter, also referred to as an inner circumferential surface) is small, for example, below $\phi 12$ mm, the protrusion amount of the cutting edge from the outer circumferential surface of the holder is about 1.5 mm at most, though it depends on the outer diameter of the holder (normally about 10 mm). Therefore, the gap (space) between the inner circumferential surface of the hole and the outer circumferential surface of the holder becomes too small, such that it is difficult to remove the chips produced in the cutting process from the inlet of the hole of the workpiece at the rear end (base) of the holder (also called a shank) to the outside (rear end side of the holder). Further, the deeper the hole in the cutting conditions, the more serious the problem becomes. As the performance of the chip control (removing) degrades, the chips are easily stuck between the inner circumferential surface of the machined hole and the cutting edge or the holder. Accordingly, the machined surface (inner circumferential surface) is damaged, and the machined surface is roughened. Further, in some cases, machining is inevitably stopped in order to remove the chips. This problem tends to occur in particular in an external oil supply type apparatus in which cutting oil is supplied from the outside, rather than in an internal oil supply type apparatus in which cutting oil is supplied from the front end of the holder.

As a countermeasure considered for controlling the chips, the portion of the holder including the front end in particular which is inserted into the inner circumferential surface of the hole of a workpiece is thinned, in addition to controlling the shape, state, or removing direction of the chips. However, simply thinning the holder causes chatter vibration due to a decrease in stiffness. Therefore, in order to more efficiently remove the chips without causing chatter vibration, a technology has been proposed in which various shapes of chip pockets (concave portions, hereinafter also referred to as pockets) are formed at the head (the portion close to the front end) of the holder where the cutting insert is fixed. This technology intends to effectively remove the chips produced in the inner surface machining to the outside by forming the pockets in the proper places and using them as channels or guides.

For example, a cutting tool for boring (boring bit) has been proposed that has a pocket (front end-sided chip pocket) formed concavely with respect to the outer circumferential surface of a holder above the cutting surface of a cutting insert that is fixed to the front end of a holder; and a chip pocket inclined upward toward the rear end of the head of the holder (shank) and connected to the pocket (space above the cutting surface). According to this cutting tool, a first sub-pocket (cutting surface-sided chip pocket) is formed to extend forward and backward on the outer circumferential surface of the holder where the cutting edge overhangs, in the upper side of the cutting surface of the cutting insert. A second sub-pocket is formed to extend forward and backward on the outer circumferential surface of the holder at the opposite side to the side where the cutting edge overhangs, in the upper side of the cutting surface of the cutting insert. Also, a rib extending forward and backward is formed between the first sub-pocket and the second sub-pocket in the holder, and the front surface (front end surface) of the rib is connected to the inclined pocket. See, for example, Japanese Patent Application Laid-Open No. 2005-279855-A.

In cutting (machining an inner surface) by the cutting tool for boring described above, the following effects (1) and (2) can be achieved on discharging the chips.

(1) Chips produced in machining the inner circumferential surface of a hole and comminuted into in small sizes are received in the first sub-pocket formed on the outer circumferential surface of the holder at the side of the cutting edge from the chip pocket that has received the chips first, and then removed to the outside of the machined hole through the first sub-pocket.

(2) The chips not comminuted are received in the second sub-pocket formed on the outer circumferential surface of the holder at the circumferential opposite side with respect to the cutting edge from the chip pocket, and then removed outside through the second sub-pocket. Therefore, less chips are stuck or come between the machined hole and the holder, such that a very accurate hole can be machined.

3. Problems to be Solved by the Invention

When a sample of a cutting tool having the above configuration (minimum machinable inner diameter: $\phi 10$ mm) is used for a cutting test, the following results (1) and (2) are confirmed. The cutting test is performed in two cases where chips are comminuted (sheared) in small sizes (workpiece: stainless steel SUS303) and where chips are relatively continuous (workpiece: stainless steel SUS304), by changing the shape of a breaker of a cutting insert. Here, the test conditions include the diameter (inner diameter) of the hole: 10 mm, hole depth: 20 mm, cut depth: 0.25 mm, cutting feed: 0.05 mm/rev, cutting speed: 80 m/min, and external cutting oil supply.

(1) In the cutting in which chips are comminuted into small sizes, the chips mainly flow only to the first sub-pocket. However, since the chip pocket is small as a concave space, it is difficult to remove the chips to the outside from the chip pocket, such that the chips tend to stick and remain on the inner circumferential surface. Therefore, a quality of the roughness on the machined surface degrades in a finish cutting.

(2) While the continuous chips (relatively long chips) flow to the second sub-pocket as well, the continuous chips tend to flow into the first sub-pocket instead. It appears that this is because chips remain even though removed to the second sub-pocket. Further, since the chip pocket of the first sub-pocket is small in this case as well as a concave space, the chips tend to remain between the first sub-pocket (concaved surface) and the inner circumferential surface of the hole. Therefore, the chips are easily wound and stuck to the cutting edge or the holder, such that a quality of the roughness on the machined inner circumferential surface degrades.

That is, when a relatively small-diameter and deep hole is machined in an external oil supply type apparatus by a cutting tool for boring of the related art, the chips tend to flow into the first sub-pocket and also remain in the hole, regardless of their shape. This phenomenon is seen by observing the removed state of the chips in the cutting process, or by observing the inner circumferential surface of the hole of the workpiece in the process of taking out the cutting tool after cutting is stopped, or in the process of taking out the cutting tool after a deep hole is machined.

SUMMARY OF THE INVENTION

The present invention has been made in consideration of the above problems of the prior art, and an object thereof is to provide a cutting tool for boring which can more smoothly remove chips to the outside (to the rear end side of a holder), regardless of the shape of the chips, even under cutting conditions where a relatively small-diameter and deep hole is machined by a cutting tool for boring.

The present invention, as set forth below, has been achieved by fabricating a plurality of cutting tool samples with various arrangements of pockets close to the front end of a holder, and by continuously developing and improving the samples through repeated cutting tests.

In a first embodiment, the present invention provides a cutting tool for boring, comprising: a bar-shaped holder; and a cutting insert fixed at a front end of the holder, the cutting insert having an cutting edge which overhangs from an outer circumferential surface of the holder, wherein the holder includes: a cutting surface-sided chip pocket that is concave with respect to the outer circumferential surface of the holder on a cutting surface of the cutting insert, the cutting surface-sided cut chip pocked configured to open to a portion of the outer circumferential surface where the cutting edge overhangs, the cutting surface-sided chip pocket having a bottom surface that faces the portion of outer circumferential surface where the cutting edge overhangs at a side opposite the portion of outer circumferential surface where the cutting edge overhangs, and wherein, an cutting edge-sided chip pocket is formed at the portion of the outer circumferential surface where the cutting edge overhangs such that an edge of the portion of the outer circumferential surface where the cutting edge overhangs is concave with respect to the outer circumferential surface of the holder, on a bottom of the cutting surface-sided chip pocket when viewed from the cutting surface.

In a preferred embodiment, a depth of the cutting surface-sided chip pocket from the edge of the portion of the outer circumferential surface where the cutting edge overhangs when viewed from the cutting surface decreases at least at a portion close to the rear end, along a direction toward the rear end of the cutting surface-sided chip pocket.

In another preferred embodiment, the cutting edge-sided chip pocket is formed such that the rear end of the cutting edge-sided chip pocket is behind the rear end of the cutting surface-sided chip pocket, at the rear portion of the holder.

In yet another preferred embodiment, an edge opposite the cutting surface-sided chip pocket in the cutting edge-sided chip pocket forms a protrusion that overhangs, outside of the outer circumferential surface of the holder on a cross-section taken perpendicular to the axial line of the holder.

In yet another preferred embodiment, the cutting edge-sided chip pocket is concaved substantially in parallel with an axial line of the holder.

In yet another preferred embodiment, a chamfered portion is formed where the bottom surface of the cutting surface-sided chip pocket and the bottom surface of the cutting edge-sided chip pocket intersect and where a ridge extending along the frontward and backward of the holder is formed.

In yet another preferred embodiment, the chamfered portion is formed in a convex arc-shaped curve on a cross-section perpendicular to an axial line of the holder.

According to the above embodiments of the present invention, when the inner circumferential surface of a hole of a workpiece is machined by the cutting tool of the present invention, even if the inner circumferential surface comes close to the side of the outer circumferential surface of the holder where the cutting surface-sided chip pocket and the cutting edge-sided chip pocket are formed, a gap (cut chip discharging route) extending in the circumferential direction, corresponding to both pockets, is present between the inner circumferential surface and the outer circumferential surface. Therefore, it is possible to allow the chips flowing to the cutting surface-sided chip pocket (corresponding to the first sub-pocket in the related art described above) of the chips produced to flow or be introduced into the cutting edge-sided chip pocket, even if a small-diameter and deep hole is machined. That is, in the present disclosure, as compared with the related art without such an cutting edge-sided chip pocket, the cutting edge-sided chip pocket connected to the cutting surface-sided chip pocket is further formed, such that the present invention has a configuration in which the cutting surface-sided chip pocket and the cutting edge-sided chip pocket are not separated (not formed at a distance from each other), but rather are formed adjacent to each other. Therefore, it is possible to ensure a large space at the inner circumferential surface of the workpiece (hole), the cutting surface of the holder, and the cutting edge (front flank). Consequently, it is possible to more smoothly remove the cut chip, regardless of the shape of the cut chip.

In the present invention, since the cut chip flowing to the cutting surface-sided chip pocket is allowed to flow to the cutting edge-sided chip pocket, the cut chip is prevented from remaining in the cutting surface-sided chip pocket and can be more efficiently removed to the outside. This effect is remarkable under a cutting condition in which only a small space can be ensured between the outer circumferential surface of the holder in the side of the cutting edge (front flank) and the inner circumferential surface of the workpiece. This is because it is difficult to ensure a large amount of protrusion of the cutting edge from the outer circumferential surface of the holder, as a cutting tool for boring that is used to machine a small-diameter hole. In particular, the effect is remarkable in machining a deep hole. In machining the inner circumferential surface of a hole of a workpiece by the cutting tool of the present invention, since it is possible to more efficiently handle a cut chip in comparison to cutting with a cutting tool of the related art, the roughness of the machined surface of the inner circumferential surface is not decreased. Although a large depth of the cutting edge-sided chip pocket as viewed from the side of the cutting surface is required for ensuring a space for discharging a cut chip, the depth may be set in accordance with machining conditions within a range of ensuring sufficient stiffness, depending on the length or thickness of the holder.

According to the embodiments of the present invention, the chips flowing to the cutting surface-sided chip pocket are guided rearward to the bottom surface by the configuration, such that the chips are actively led to the cutting edge-sided chip pocket of the portion of outer circumferential surface where the cutting edge overhangs. Therefore, the chips are smoothly moved and delivered from the cutting surface-sided chip pocket to the cutting edge-sided chip pocket, so as to prevent the chips from remaining in the cutting surface-sided chip pocket, and to more smoothly remove the chips toward the rear end side of the holder. In the cutting surface-sided chip pocket, the bottom surface facing the portion of outer circumferential surface where the cutting edge overhangs from the front end is determined within a range that does not interfere with the cutting insert. Particularly, the bottom surface is configured such that the removed chips can be efficiently received, in consideration of the removing direction of the chips produced in cutting by the cutting edge (removing angle of the cut chip).

Further, in the present invention, the rear ends of the cutting surface-sided chip pocket and the cutting edge-sided chip pocket may be positioned as close as possible to the rear end (base end) of the holder. This is because the chips can be easily removed to the rear side in this case. Therefore, the position of the rear ends may be determined, corresponding to the depth of the hole to be machined. However, the cutting surface-sided chips are likely to decrease second moment of area against the main component force applied to the front end of the holder in cutting, depending on the forming method. Therefore, when the rear end of the cutting surface-sided chip pocket extends rearward, the stiffness of the holder is easily decreased, which causes chatter vibration. In contrast, since the cutting edge-sided chip pocket is concaved on the portion of outer circumferential surface where the cutting edge overhangs, the second moment of area against the main component force is influenced to a lesser degree. Further, the chips can be easily removed rearward, by positioning the rear end of the cutting edge-sided chip pocket behind the rear end of the cutting surface-sided chip pocket. Therefore, it is possible to increase the discharging performance of the chips while preventing the stiffness from being decreased, by using the configuration described in the exemplary embodiments. Positioning the rear end of the cutting edge-sided chip pocket outside the hole of the workpiece is desirable for more efficiently discharging the chips.

In the embodiment of the present invention described above, the cut chip flowing to the cutting surface-sided chip pocket flows to the cutting edge-sided chip pocket and then is removed to the rear side of the holder. The cut chip flowing into the cutting edge-sided chip pocket is turned into the bottom surface (opposite the cutting surface) of the holder, above the edge of the opposite side to the cutting surface in the cutting edge-sided chip pocket, between the inner circumferential surface of the workpiece and the outer circumferential surface of the holder, by rotation of the workpiece about the cutting edge. In particular, a continuous cutting edge may cause the cut chip to be wound around the holder. Similar to the cutting tool for boring according to the exemplary embodiment of the present invention, when the edge has a protrusion, the protrusion can prevent the cut chip from turning, such that the cut chip is effectively prevented from coming between the inner circumferential surface of the workpiece and the outer circumferential surface of the holder or winding and sticking to the holder. In the cutting tool for boring according to the exemplary embodiment of the present invention, the edge positioned opposite the cutting surface-sided chip pocket in the cutting edge-sided chip pocket implies that the edge is close to the bottom surface (opposite the cutting surface) of the holder in the cutting edge-sided chip pocket. The protrusion may continuously extend along the cutting edge for realizing this function.

Further, as the cutting tool for boring according to the exemplary embodiment of the present invention, since the cutting edge-sided chip pocket is concaved substantially in parallel with the axial line of the holder, it is possible to further prevent a decrease in strength (stiffness) of the holder against the main component force in cutting, as compared with when the cutting edge-sided chip pocket is formed at an angle with respect to the axial line of the holder so as to be spaced apart from the cutting surface toward the rear side. Further, as the cutting tool for boring according to the exemplary embodiment of the present invention, when the cutting edge-sided chip pocket is formed, it is easy to remove the cut chip that has flowed in the cutting edge-sided chip pocket to the rear side of the holder. In this manner, it is possible to prevent the cut chip from turning on the outer circumferential surface of the holder.

In the present invention as described above, the cutting edge-sided chip pocket is formed on the outer circumferential surface such that the edge of the portion of outer circumferential surface where the cutting edge overhangs is concave with respect to the outer circumferential surface of the holder, on the bottom surface of the cutting surface-sided chip pocket when viewed from the side of the cutting surface. As described above, when the inner circumferential surface of a hole of a workpiece is machined, even if the inner circumferential surface comes close to the outer circumferential surface of the holder where the cutting surface-sided chip pocket and the cutting edge-sided chip pocket are formed, a gap (cut chip discharging route) extending in the circumferential direction, corresponding to both pockets is present between the inner circumferential surface and the outer circumferential surface. In the configuration of the present invention described above, the bottom surfaces of both pockets are connected (adjacent to each other) such that the bottom surface of the cutting surface-sided chip pocket intersects with the surface (bottom surface) of the cutting edge-sided chip pocket, thereby forming a ridge extending frontward and backward at the intersecting place, that is, where the bottom surfaces of the two pockets are in contact.

In the present invention, the portion where the ridge extends along the frontward and backward along the holder, that is, where the ridge is formed (the bottom surfaces where the two pockets intersect), may be chamfered. Further, in this case, as the cutting tool for boring according to the exemplary embodiment of the present invention, although the chamfered portion may form a convex arc-shaped curve (convex rounded portion) on the cross-section perpendicular to the axial line of the holder, it may be an inclined chamfered portion that can be easily machined, it may be composed of an arc-shaped curve and a curved surface, or it may have a concave arc shape. That is, chamfering as used herein may be rounded or cut at the portion where the ridge is formed by intersecting the bottom surfaces of the two pockets, so that there is no angle by the ridge.

When the chamfered portion is formed, particularly, the larger the chamfered portion (the radius of the convex rounded portion or the width of the inclined chamfered portion), the larger the gap (cut chip discharging route) extending in the circumferential direction between the inner circumferential surface and the outer circumferential surface, when the inner circumferential surface comes close to the outer circumferential surface where the cutting surface-sided chip pocket and the cutting edge-sided chip pocket are formed, in machining the inner circumferential surface of a hole of the workpiece. Therefore, the cut chip smoothly flows from the cutting surface-sided chip pocket to the cutting edge-sided chip pocket. The size and the cross-sectional shape of the chamfered portion are determined in consideration of the flow of the cut chip or the decrease in stiffness of the holder. As the chamfered portion increases, the boundary between the cutting surface-sided chip pocket and the cutting edge-sided chip pocket becomes unclear and thus both pockets are, so to speak, combined.

The foregoing summary is illustrative only and is not intended to be in any way limiting. In addition to the illustrative aspects, embodiments and features described above, further aspects, embodiments, and features will become apparent by reference to the drawings and the following detailed description.

DETAILED DESCRIPTION

Figure 1:
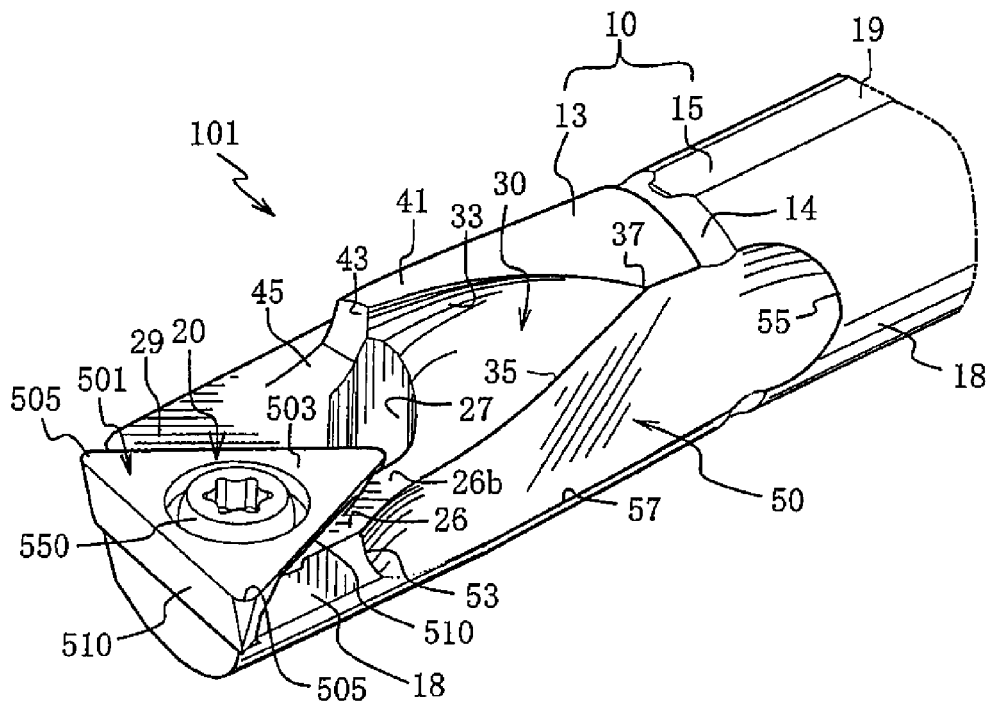
FIG. 1 is a perspective view of the main parts of a cutting tool for boring according to a first exemplary embodiment of the present invention, as seen from above a front end inclination (cutting surface).
Figure 2:
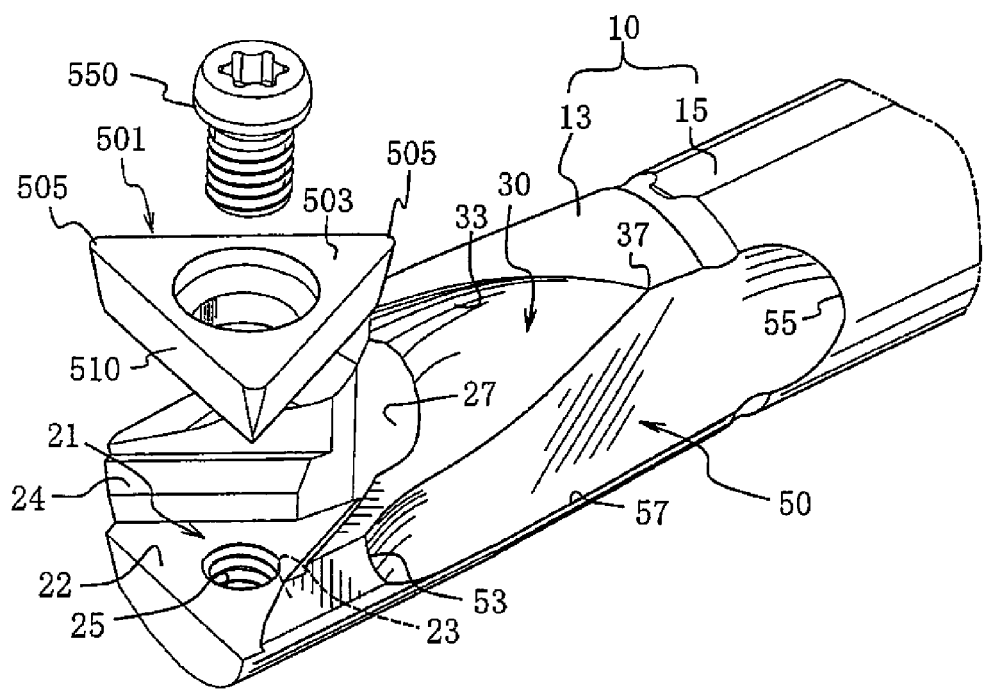
FIG. 2 is an exploded perspective view of FIG. 1.

Next, the present invention is described in detail with reference to the drawings. However, the present invention should not be construed as being limited thereto.

Exemplary embodiments of the present invention are described in detail with reference to FIGS. 1 to 9. Reference numeral 101 designates a cutting tool for boring (boring bit) according to an exemplary embodiment of the present disclosure. The present exemplary embodiment includes a bar-shaped holder (shank) 10 and a cutting insert 501 (positive type of triangular chip, hereafter also referred to as a triangular chip) formed in a triangular plate shape, which is fixed to the front end of the front end-sided portion (head) 13 of holder 10, and its detailed configuration is as follows.

That is, holder 10 is a cylindrical bar, and has, on its front end, cutting insert 501 (triangular chip) with a screw hole, and, above a cutting surface 503 of the chip, a front end-sided chip pocket 20 that is concave with respect to the outer circumferential surface of holder 10 (a space above cutting surface 503 that is concave with respect to the outer circumferential surface of holder 10), the cutting insert being fixed by tightening a clamp screw 550. However, front end-sided portion 13 of holder 10 having a portion fixing triangular chip 501 has an outer diameter (for example, ϕ9 mm) that is slightly larger than the outer diameter (for example, ϕ8 mm) of a rear end-sided portion 15 (shank) behind portion 13, such that holder 10 is entirely formed in a cylindrical bar composed of two parts having different diameters and a common axis. Although the present exemplary embodiment includes a concave triangular chip seat 21 to seat and fix triangular chip 501 at the front end of front end-sided portion 13 (see, for example, FIG. 2), chip seat 21 and a cutting surface-sided chip pocket or an cutting edge-sided chip pocket, described below, are formed by cutting as a base, a cylindrical bar made of alloy steel with different diameters and a common axis. Although a front end-sided part before a concave portion 14 in the circumferential direction at the front end of shank 15 is referred as front end-sided portion 13 in the present exemplary embodiment, the lengths of front end-sided portion 13 and shank 15 are about 20 mm and 80 mm, respectively.

According to chip seat 21 of holder 10 (see, for example, FIG. 2), when triangular chip 501 is fixed, as shown in FIGS. 1 to 5, one (1) cutting edge 505 for cutting overhangs from the outer circumferential surface of holder 10, such that the cutting surface 503 is positioned around a plane H (virtual plane) passing through the axial line G of holder 10. Further, chip seat 21 is concave in a notch shape in head 13 such that cutting edge 505 is positioned on plane H. The protrusion amount T of cutting edge 505 from the outer circumferential surface of shank 15 is set to 1.0 mm, such that cutting tool 101 according to the present exemplary embodiment is used for machining the inner circumferential surface of a small hole having an inner diameter of at least ϕ10 mm.

In chip seat 21, with cutting insert 501 fixed, two restricting walls 23 and 24 that restrict two sides 510 (relief sides) of triangular chip 501 are formed upward from a seat surface 22 such that the other two (2) cutting edges 505 not for cutting (hereinafter, referred to as noses in order to discriminate from cutting edge 505 for cutting) do not overhang from the outer circumferential surface of holder 10. Accordingly, the bottom surface (triangular major surface opposite to cutting surface 503) of triangular chip 501 is seated on flat seat surface 22 of chip seat 21, with two (2) sides (relief sides) 510 and 510 in contact with restricting walls 23 and 24, and then triangular chip 501 is clamped by inserting a clamp screw 550 in a threaded hole 25 for clamp screw 550 formed substantially at the center portion of seat surface 22. After the clamp screw is inserted, the head (top) of screw 550 is at substantially the same height as the cutting surface 503.

In the present exemplary embodiment, although two restricting walls 23 and 24 are formed in a V-shape with degrees, with the front end open, when seen from the side of cutting surface 503 (see, for example, FIG. 3) such that cutting edge 505 protruding from the outer circumferential surface of holder 10 is positioned at the front end, chip seat 21 is biased to the protrusion side of cutting edge 505 with respect to the axial line G of holder 10. Therefore, when seen from the side of cutting surface 503 (see FIG. 3), restricting wall 23 (protrusion-sided restricting surface) that restricts side 510 between cutting edge 505 protruding from the outer circumferential surface and nose 505 received in a relief portion 27 (described below) is thinner than restricting wall 24 that restricts side 510 between two noses 505 and 505 not for cutting. Relief portion 27 (depression) that receives nose 505 is formed at the corner where the two restricting walls 23 and 24 cross, and is cut inward in a substantially arc shape, when seen from the side of cutting surface 503.

Holder 10 includes a cutting surface-sided chip pocket 30 that is concave with a substantial flat bottom, with respect to the outer circumferential surface of holder 10, and is connected to a front end-sided chip pocket (space) 20 above the cutting surface 503 of triangular chip 501, in the side of cutting surface 503 of triangular chip 501 fixed to head 13. Cutting surface-sided chip pocket 30 is open to the portion 18 of outer circumferential surface (at the lower portion in FIG. 3) of holder 10 where cutting edge 505 of cutting insert 501 overhangs from the outer circumferential surface of the holder 10 (front flank of cutting edge 505 facing the inner circumferential surface of a hole to be machined). Further, cutting surface-sided chip pocket 30 is made concave to have a bottom surface 33 facing the portion 18 of outer circumferential surface where the cutting edge overhangs, in the side opposite the portion 18 of the outer circumferential surface where the cutting edge overhangs (see S2 and S3 cross-sections in FIG. 6). Further, in the present exemplary embodiment, cutting surface-sided chip pocket 30 is formed at the side of cutting edge 505 (at the lower portion in FIG. 3) from axial line G of holder 10, including relief portion 27 when seen from cutting surface 503 (see, for example, FIG. 3), in which the width decreases toward the rear end, that is, the depth F1 decreases toward the rear end. For reference, the depth F1 is about ½ to 0 of the outer diameter of holder 10 in the present exemplary embodiment. The bottom surface 33 of cutting surface-sided chip pocket 30 is in substantially the same plane as the cutting surface 503 of the triangular chip 501, at upper edge 26 where relatively thin restricting wall 23 is formed, and at the rear side (the right side in FIGS. 3 and 4) and portion 26b, close to triangular chip 501, when viewed from the side of the protruding cutting edge 505 (see, for example, FIG. 4). Further, the bottom surface 33 rises above cutting surface 503 toward the rear side from the same plane.

Though a detailed description is provided below, in the present exemplary embodiment, a second cutting surface-sided chip pocket 130, which is connected to front end-sided chip pocket 20 above cutting surface 503 of triangular chip 501, concave with respect to the outer circumferential surface of holder 10, with an upper edge 29 of restricting wall 24 at substantially the same height as cutting surface 503, and extending rearward from the same height portion, is formed opposite the side where cutting edge 505 overhangs, when seen from the side of cutting surface 503. Therefore, a convex portion 41 that is wide rearward and overhangs upward is formed between two cutting surface-sided chip pockets 30 and 130 of the holder 10, when viewed from the side of cutting surface 503, and a front end 43 of convex portion 41 is the front end of bottom surface 33 which faces the portion 18 of the outer circumferential surface where the cutting edge overhangs. Front end 43 of convex portion 41 forms an inclined front ended surface 45 that rises (elevates) at an angle rearward from cutting surface 503, at the side opposite protruding cutting edge 505 which is the side of nose 505 received in relief portion 27. Therefore, in the present exemplary embodiment, basically the chips flowing on cutting surface 503 of triangular chip 501 are directed toward the bottom surface 33 of the cutting surface-sided chip pocket 30 facing the portion 18 of outer circumferential surface where the cutting edge overhangs, rather than the front ended surface 45, when viewed from the side of cutting surface 503 (see, for example, FIG. 3), thereby enhancing removability. That is, most of the chips in the range of an angle θ, which is seen from the side of cutting surface 503, made by axial line G and a line L1 constructed from the cutting edge to front end 43 of convex portion 41, are set to be received in the cutting surface-sided chip pocket 30. The angle θ may be in the range of 20 to 40 degrees.

Meanwhile, when holder 10 is seen from the side of cutting surface 503, an cutting edge-sided chip pocket 50 which is cut on the portion 18 of the outer circumferential surface where the cutting edge overhangs in holder 10, that is, the front flank such that an edge 35 of the portion 18 of the outer circumferential surface where the cutting edge overhangs of the bottom surface 33 of the cutting surface-sided chip pocket 30, is concave with respect to the outer circumferential surface of holder 10. In the present exemplary embodiment, cutting edge-sided chip pocket 50 is concaved substantially in parallel with axial line G of holder 10, along the edge 35 of the portion 18 of the outer circumferential surface where the cutting edge overhangs of the cutting surface-sided chip pocket 30, that is, along the ridge where the cutting surface-sided chip pocket 30 and the cutting edge-sided chip pocket 50 intersect, when viewed from the side of the cutting surface 503. Although the depth F2 from cutting edge 505 of cutting edge-sided chip pocket 50 viewed from the side of cutting surface 503 is set appropriately in accordance with the protrusion amount T of cutting edge 505 or thickness of holder 10, or in compliance with requirements for ensuring the area of a channel for discharging the chips according to cutting conditions, it may be set within 15 to 30% of the diameter of shank 15.

Figure 3:
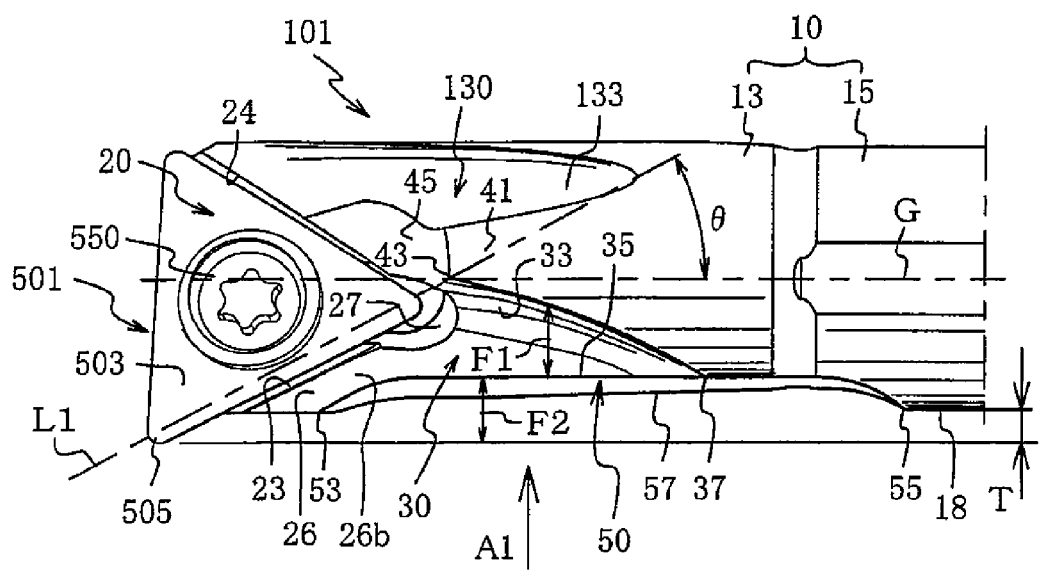
FIG. 3 is a view of the cutting tool for boring of FIG. 1, as seen from a cutting surface.
Figure 4:
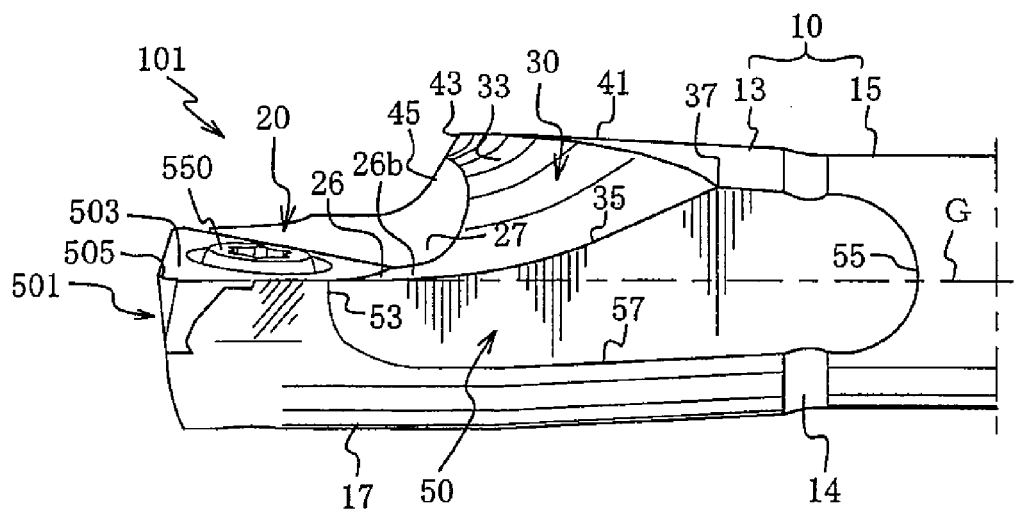
FIG. 4 is a view of FIG. 3 as seen from a portion of an outer circumferential surface where the cutting edge overhangs (the front relief side, in the direction of an arrow A1).

Further, in the present exemplary embodiment, the front end 53 of the cutting edge-sided chip pocket 50 starts from the middle portion of the relatively thin restricting wall 23, as shown in FIGS. 3 and 4, and the rear end 55 is positioned behind rear end 37 of cutting surface-sided chip pocket 30 and at shank 15 behind the head 13. The cutting edge-sided chip pocket 50 is formed substantially flat along axial line G of the holder 10 in the present exemplary embodiment, except for the concave rounded surface around the front and rear ends 53 and 55. Therefore, the cutting edge-sided chip pocket 50 when holder 10 is viewed from the side of protruding cutting edge 505 (see, for example, FIG. 4), that is, as viewed from the front flank of cutting edge 505, has a wide flat plane that rises, taking the shape of bottom surface 33 of the cutting surface-sided chip pocket 30, toward the rear side (the right side in FIG. 4), at the middle portion.

Figure 6:
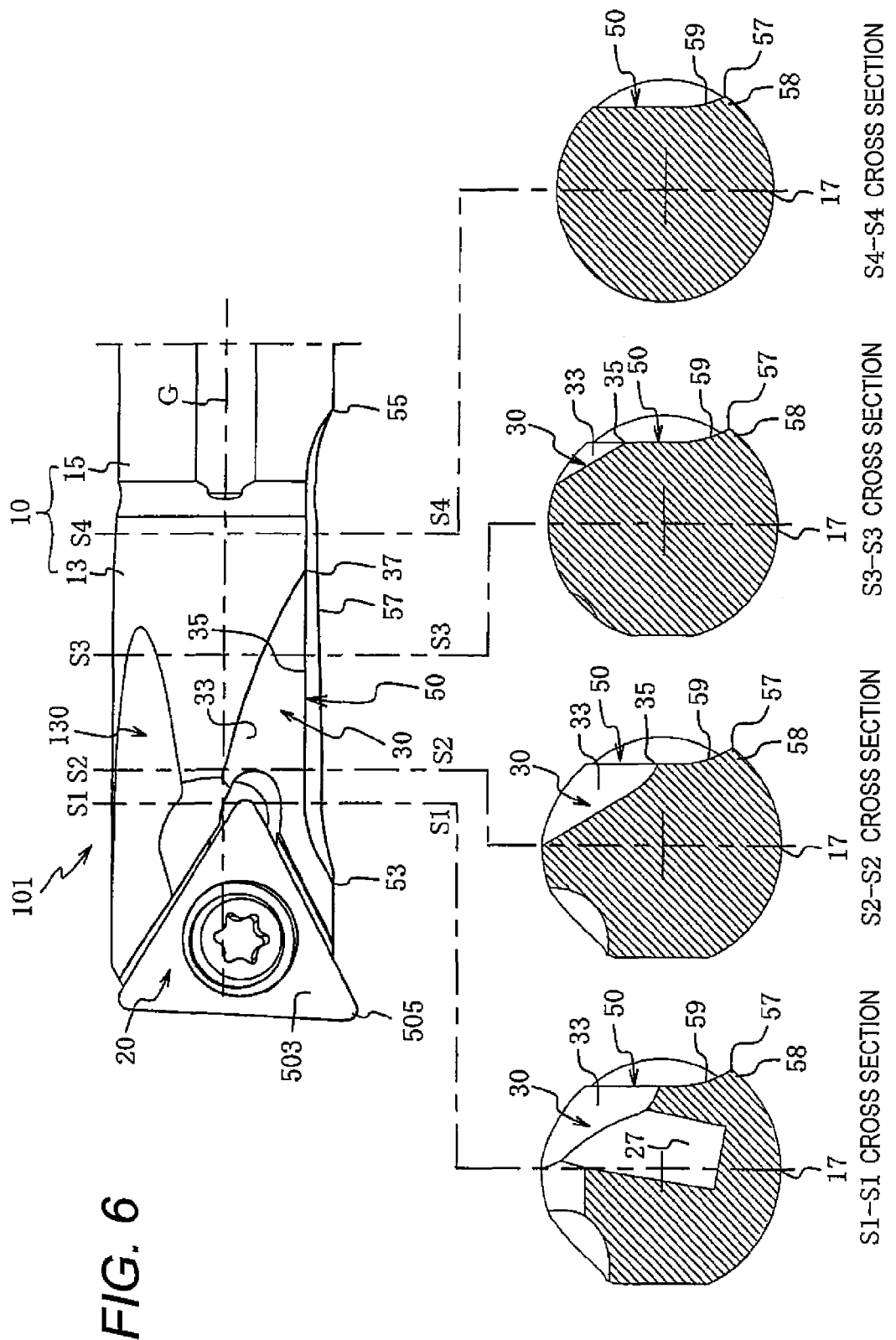
FIG. 6 is a view of the cutting tool for boring of FIG. 1, as seen from the cutting surface, and cross-sectional views of the parts at lines S1-S1, S2-S2, S3-S3 and S4-S4.

Further, in the present exemplary embodiment edge 57 opposite the cutting surface-sided chip pocket 30, in the cutting edge-sided chip pocket 50, has a protrusion 58 that overhangs outward on the cross-section perpendicular to the axial line G of holder 10 (see, for example, FIG. 6). That is, the edge close to the bottom 17 of holder 10 at cutting edge-sided chip pocket 50 (the ridge where the portion close to bottom 17 of the outer circumferential surface of the holder 10 and the cutting edge-sided chip pocket 50 intersect) forms protrusion 58 that overhangs outward, along axial line G of the holder 10.

However, portion 59 close to protrusion 58 of the cutting edge-sided chip pocket 50 (the lower portion in FIG. 4) is provided with a concave rounded portion in a transverse plane (the cross-section perpendicular to axial line G of holder 10) (see, for example, FIG. 6).

As described above, since the cutting edge-sided chip pocket 50 is formed inside the portion 18 of the outer circumferential surface where the cutting edge overhangs, with respect to the edge 35 at cutting edge 505 of the cutting surface-sided chip pocket 30, a channel through which the chips flow from the cutting surface-sided chip pocket 30 to edge the end-sided chip pocket 50 is ensured, even if the inner circumferential surface of the hole of the workpiece comes close to the side of the outer circumferential surface (front flank) of the side of cutting edge 505 of the holder 10.

In the present exemplary embodiment, although generally described above, the second cutting surface-sided chip pocket 130 having a width smaller than that of cutting surface-sided chip pocket 30 and the rear end of second cutting surface-sided chip pocket 130 positioned ahead of rear end 37 of pocket 30 is formed at the side opposite the cutting surface-sided chip pocket 30, with axial line G therebetween, when viewed from the side of from cutting surface 503. Although a second cutting surface-sided chip pocket 130 is not necessary in the present invention, if it is included, it is possible to remove chips flowing to the side opposite the protrusion side of cutting edge 505, out of second cutting surface-sided chip pocket 130. Further, a second cutting surface-sided chip pocket 130, when present, contributes to reducing the weight of the front end of holder 10, and advantageously prevents chatter vibration when stiffness is sufficient. Similar to cutting surface-sided chip pocket 30, second cutting surface-side chip pocket 130 is connected to front end-sided chip pocket 20 above the cutting surface 503 of triangular chip 501. Further, the second cutting surface-side chip pocket is concave with respect to the outer circumferential surface of holder 10, is open to the outer circumferential surface of holder 10 opposite the portion where cutting edge 505 of cutting insert 501 overhangs, and has a bottom surface 133 facing the open side.

Figure 7A:
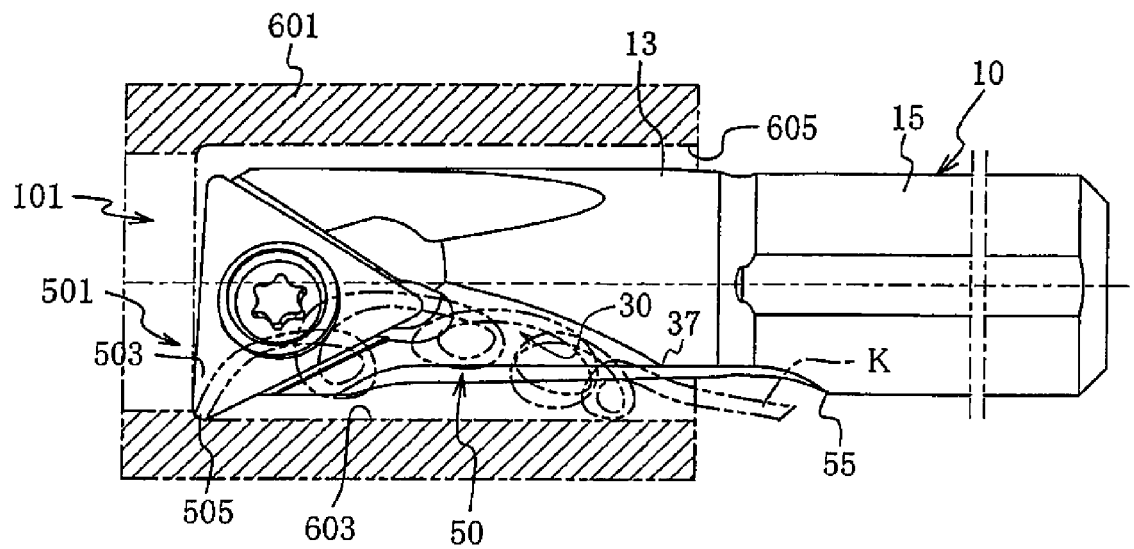
FIG. 7A is a view which illustrates the machining of the inner circumferential surface of a hole of a workpiece with the cutting tool for boring shown in FIG. 1, as seen from the cutting surface.
Figure 7B:
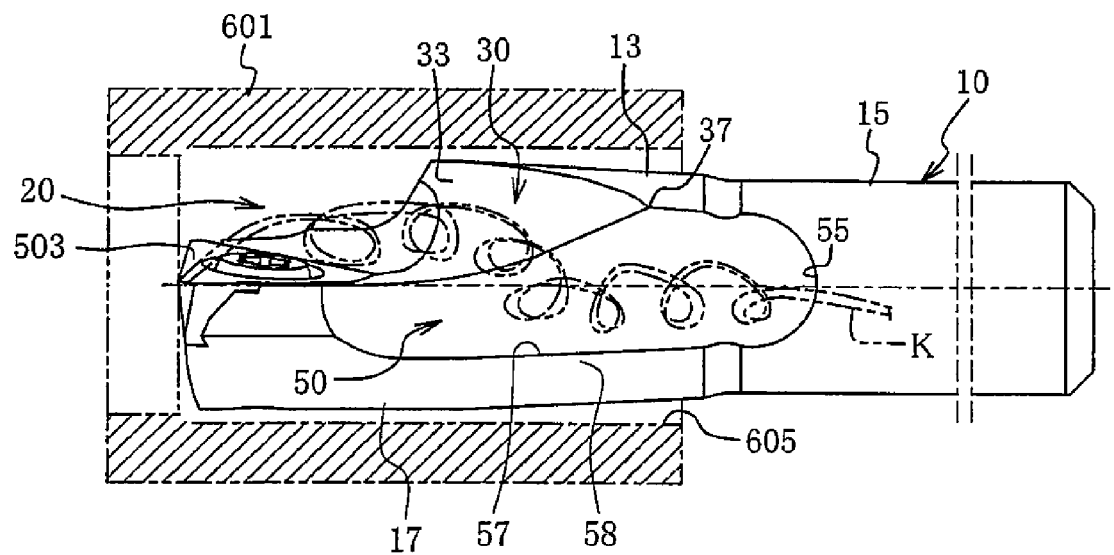
FIG. 7B is a view illustrating the same state, as seen from the portion of the outer circumferential surface where the cutting edge overhangs.
Figure 8:
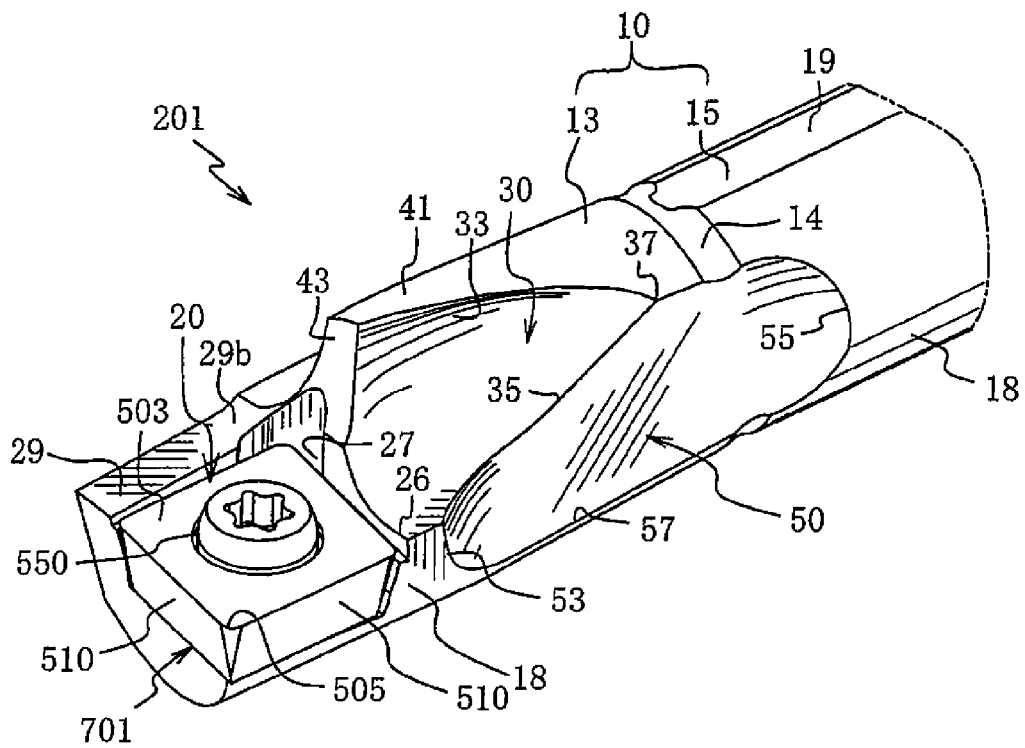
FIG. 8 is a perspective view of the main parts of a cutting tool for boring according to a second exemplary embodiment (modified embodiment) of the present invention, as seen from above a front end incline (cutting surface).

Next, the operational effects of cutting tool 101 for boring having the configuration described above, according to the present exemplary embodiment, are described with reference to FIGS. 5 and 7. That is, when an inner circumferential surface 603 of a hole in a workpiece 601 is machined by cutting tool 101, the inner circumferential surface 603 is positioned close to the outer circumferential surface of holder 10 having cutting surface-sided chip pocket 30 and cutting edge-sided chip pocket 50. A gap (cut chip-discharging route) corresponding to both pockets 30 and 50 included in this embodiment, in this case, extends between the inner circumferential surface 603 and the outer circumferential surface of holder 10, according to the present cutting tool 101 (see FIG. 7). Therefore, cut chip K cut off by cutting edge 505 and flowing from the front end-sided chip pocket 20 to the cutting surface-sided chip pocket 30 is removed to cutting edge-sided chip pocket 50 at the portion 18 of the outer circumferential surface where the cutting edge overhangs from holder 10. Therefore, as shown in FIGS. 7A and 7B, cut chip K removed to cutting edge-sided chip pocket 50 is removed outside through opening 605 of the hole from rear end 55. Namely, the cutting edge-sided chip pocket 50 connected to cutting surface-sided chip pocket 30 is formed in addition to the pocket 30. Consequently, a space between the cutting tool and inner circumferential surface 603 of the workpiece 601 increases when the inner circumferential surface 603 of the hole is machined by cutting tool 101 according to the present exemplary embodiment. Therefore, compared with the related art not having an cutting edge-sided chip pocket 50, cut chip K hardly remains on inner circumferential surface 603 regardless of its shape. Accordingly, the cut chip can be more efficiently removed outside, thereby preventing the machined surface of inner circumferential surface 603 from becoming roughened.

In particular, in the present exemplary embodiment, the depth F1 of the cutting surface-sided chip pocket 30 decreases toward the rear side, when viewed from the side of cutting surface 503. Therefore, cut chip K flowing to the cutting surface-sided chip pocket 30 is guided to the bottom surface 33 and actively guided to the cutting edge-sided chip pocket 50 at the portion 18 of the outer circumferential surface where the cutting edge overhangs, as it flows rearward. As such, the cut chip K is more smoothly moved to the cutting edge-sided chip pocket 50 from the cutting surface-sided chip pocket 30. Further, in the present exemplary embodiment, the rear end 55 of the cutting edge-sided chip pocket 50 is positioned at rear side of holder 10, further behind the rear end 37 of the cutting surface-sided chip pocket 30. Therefore, as shown in FIG. 7, when the machining of the hole, with rear end 55 of the cutting edge-sided chip pocket 50 behind opening (inlet) 605 of the hole is completed, cut chip K can be prevented from remaining in the cutting surface-sided chip pocket 30 by the cutting edge-sided chip pocket 50. Also, cut chip K can be removed more smoothly to the outside from cutting edge-sided chip pocket 50. Further, the rear end 55 of the cutting edge-sided chip pocket 50 may be positioned as far rearward as possible, unless the stiffness of holder 10 is adversely affected.

Figure 5:
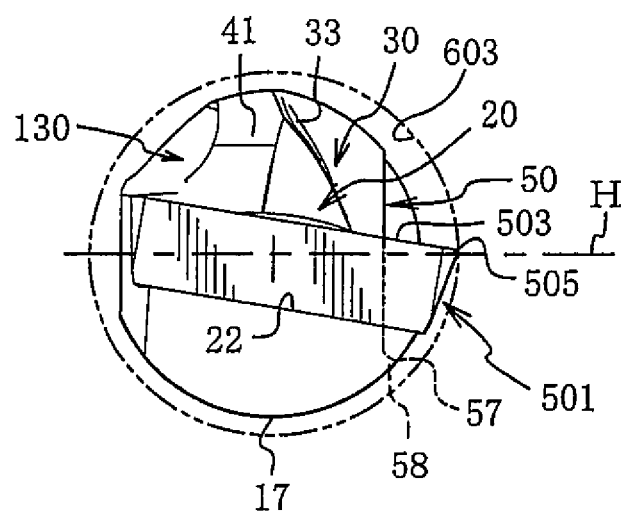
FIG. 5 is a left side view of FIG. 4.

Further, in the present exemplary embodiment edge 57 opposite the cutting surface 503, in the cutting edge-sided chip pocket 50, has a protrusion 58 that overhangs outward on a cross-section perpendicular to the axial line G of the holder 10 (see FIGS. 5 and 6). Although understood from the above discussion, the protrusion functions as a stopper that stops cut chip K, even when the cut chip K, having moved from the cutting surface-sided chip pocket 30 to the cutting edge-sided chip pocket 50, may turn to the bottom 17 of holder 10 (on a side opposite the cutting surface 503) by rotation of the workpiece 601 between the inner circumferential surface 603 and the outer circumferential surface of holder 10. Accordingly, a remarkable effect is achieved in that it is possible to prevent the cut chip K from sticking and winding on the holder 10.

Further, in the present exemplary embodiment, cutting edge-sided chip pocket 50 extends along axial line G, in parallel with axial line G of the holder 10. Therefore, it is possible to achieve the following effect, in addition to the effect described above. The cutting edge-sided chip pocket 50 is formed toward the rear end from the front end of holder 10. Thus, even though parallel with axial line G of holder 10, for example, when the cutting edge-sided chip pocket 50 extends at an angle at a predetermined distance from the cutting surface of the holder 10 (the cutting edge-sided chip pocket 50 is not concaved in parallel with axial line G of holder 10), the stiffness is decreased in the direction of the main component force applied to the holder 10 in cutting (namely, the second moment of area decreases), as compared with when it is concaved substantially in parallel with axial line G. On the other hand, in the present exemplary embodiment, since cutting edge-sided chip pocket 50 is concaved substantially in parallel with axial line G of the holder 10, it is easy to prevent the stiffness from decreasing where the cutting edge-sided chip pocket 50 is formed in the holder 10. Namely, it is possible to implement a cross-sectional shape making it easy to prevent a decrease of the second moment of area.

Further, when the cutting edge-sided chip pocket 50 extends at an angle so as to be spaced apart from the side of the cutting surface of holder 10, toward the rear end of holder 10, the cutting edge-sided chip pocket 50 extends not in parallel with axial line G, but in a twisted form, toward the rear end from the front end. Accordingly, the cut chip flowing to the rear end of the cutting edge-sided chip pocket 50 can easily flow according to the inclination, and therefore the cut chip flowing rearward can easily wind and stick on the outer circumferential surface of holder 10. However, it can be also prevented in the present exemplary embodiment.

Next, a cutting tool 201 for boring according to a second exemplary embodiment of the present disclosure is described with reference to FIGS. 8 to 13. There is a difference in that a rhombus-shaped chip 701 having two cutting edges 505 (80 degrees of nose angle) is provided in the second exemplary embodiment, when compared to triangular cutting insert 501 in the previous exemplary embodiment, but there is essentially no difference in both exemplary embodiments, including operation and effect. Therefore, the shape of the chip seat 21 and the shape of the cutting surface-sided chip pocket 30 are only a little different in view of the above difference. The difference will be briefly described. The same parts (or corresponding parts) compared to the previous embodiment are designated by the same reference numerals.

Figure 9:
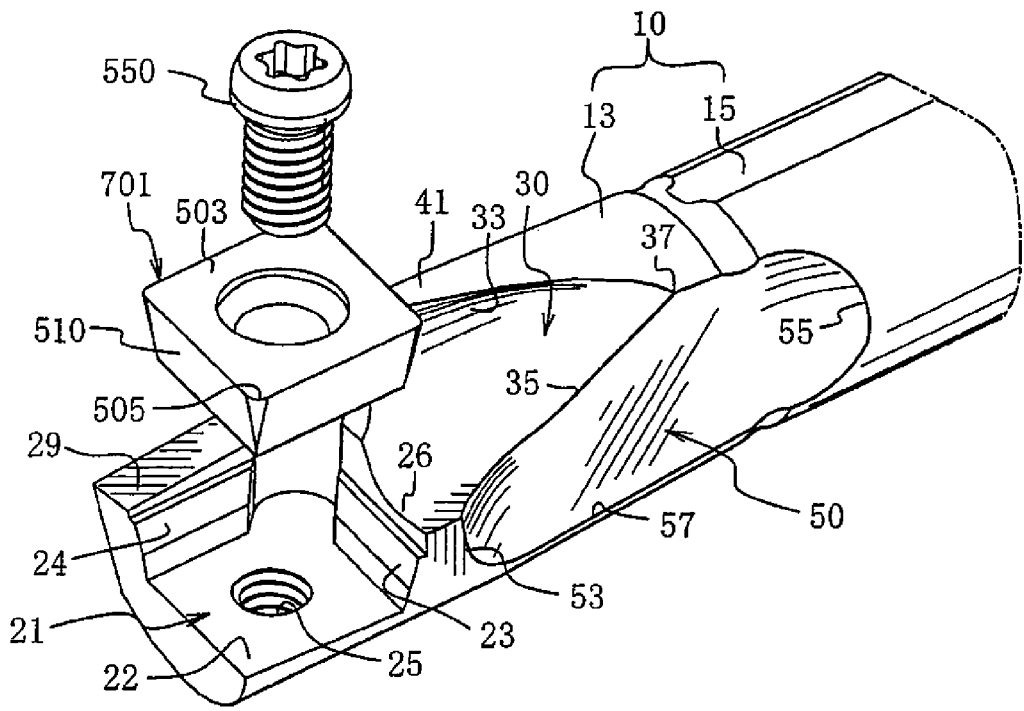
FIG. 9 is an exploded perspective view of FIG. 8.
Figure 10:
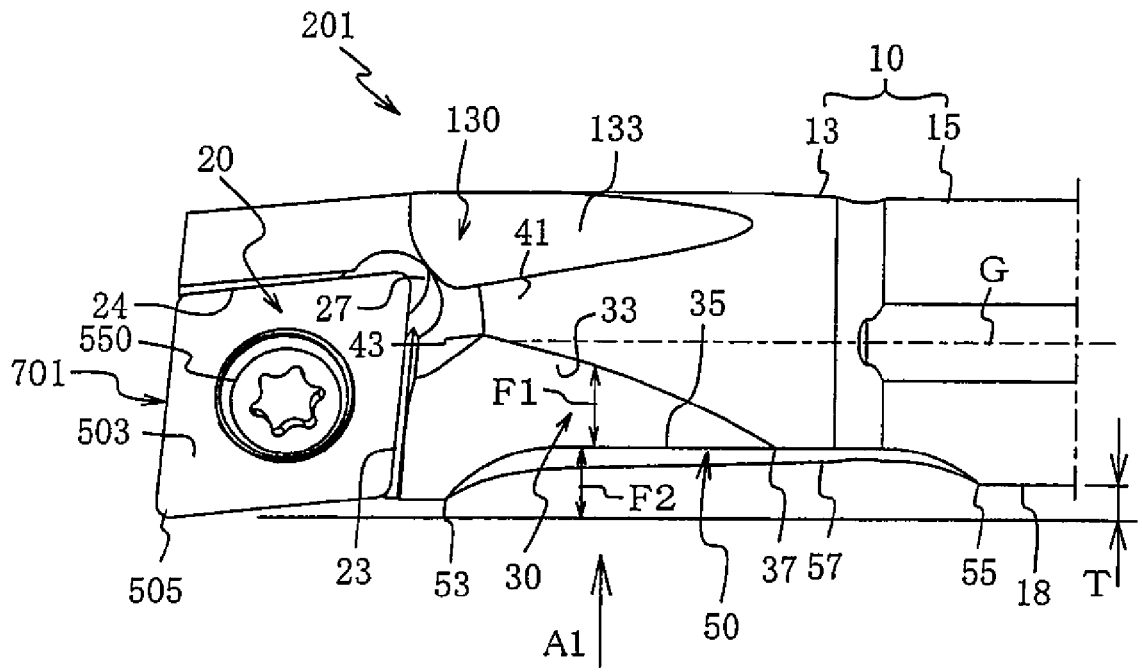
FIG. 10 is a view of the cutting tool for boring of FIG. 8, as seen from the cutting surface.
Figure 11:
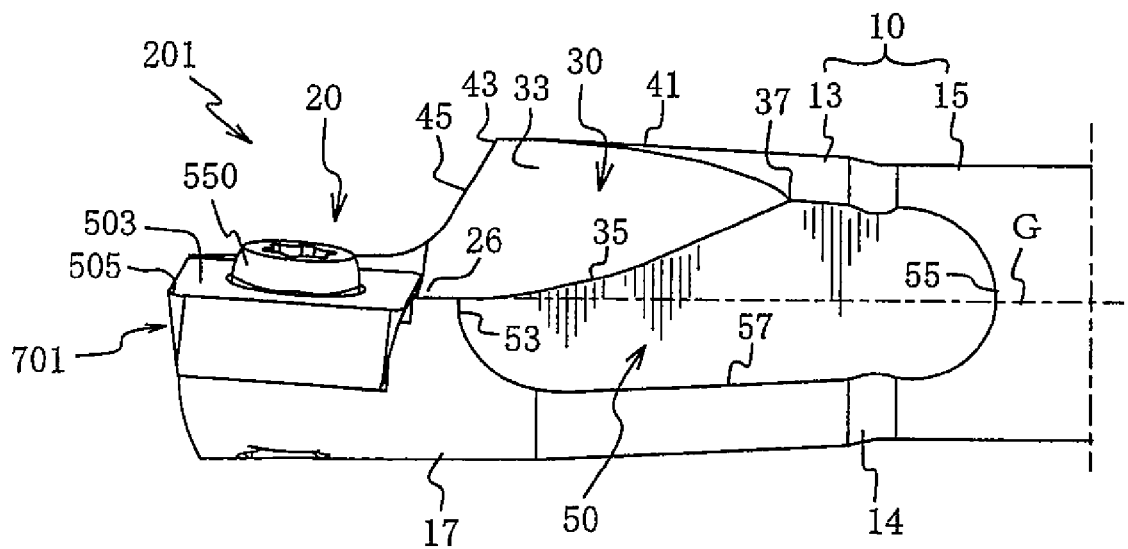
FIG. 11 is a view of FIG. 10 seen from the portion of outer circumferential surface where the cutting edge overhangs (the front relief side, in the direction of an arrow A1).
Figure 12:
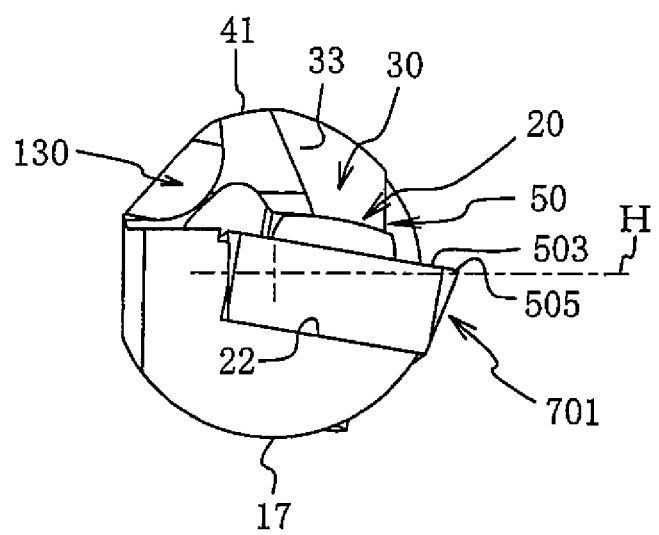
FIG. 12 is a left side view of FIG. 11.
Figure 13:
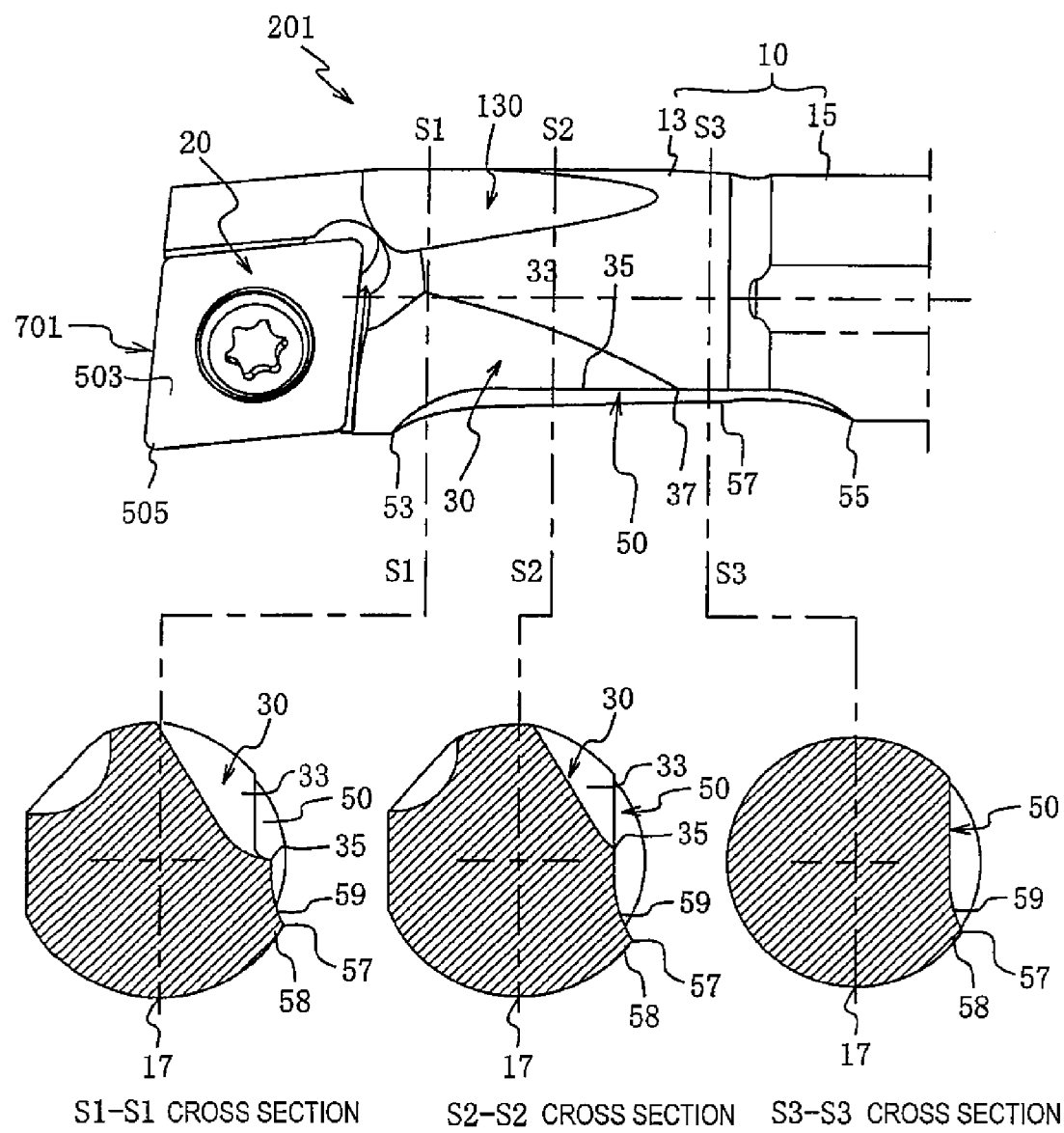
FIG. 13 is a view of the cutting tool for boring of FIG. 8, as seen from the cutting surface, and cross-sectional views of the parts at lines S1-S1, S2-S2, S3-S3 and S4-S4.
Figure 14:
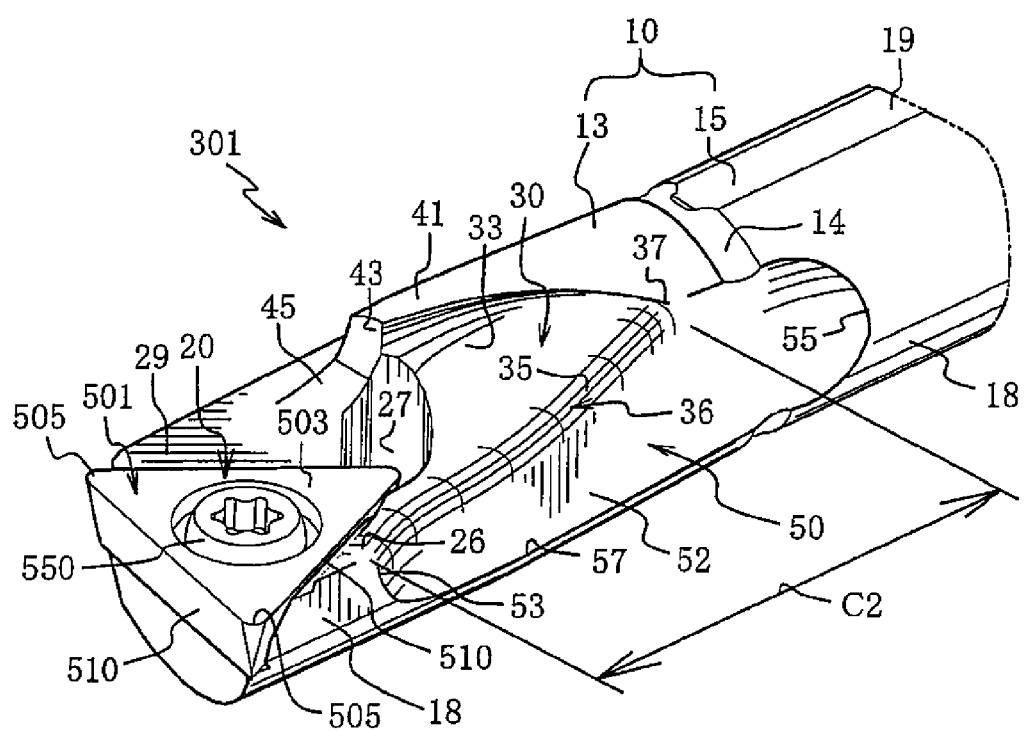
FIG. 14 is a perspective view of the main parts of a cutting tool for boring according to a third exemplary embodiment of the present invention, as seen from above a front end incline (cutting surface).
Figure 15:
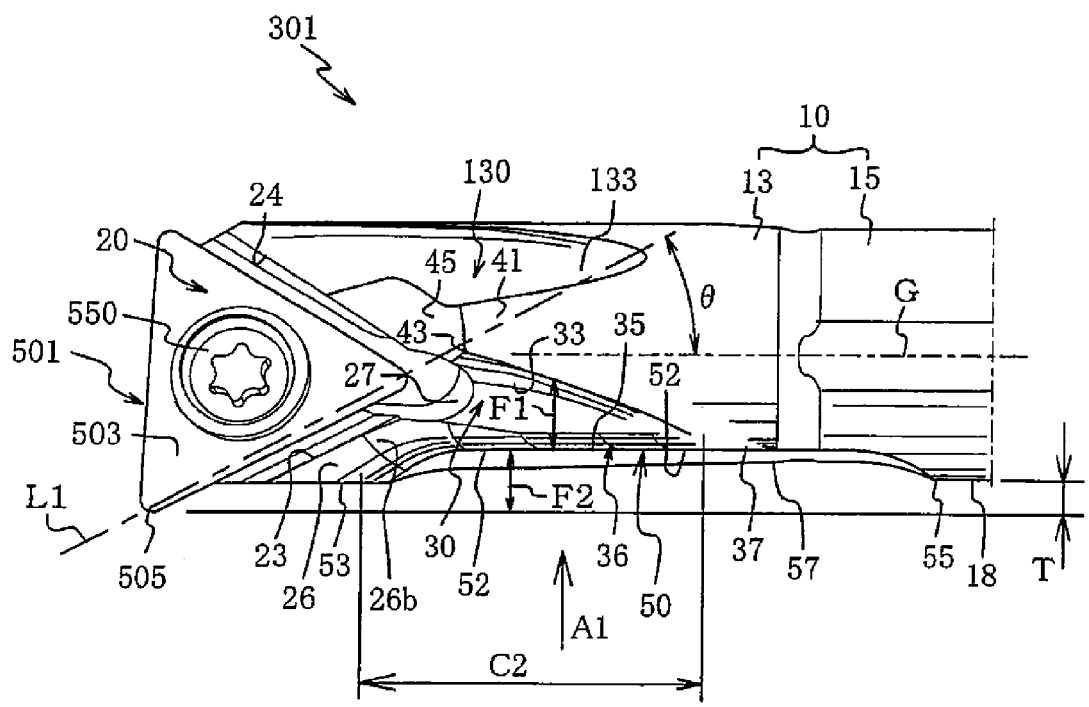
FIG. 15 is a view of the cutting tool for boring of FIG. 14, as seen from the cutting surface.
Figure 16:
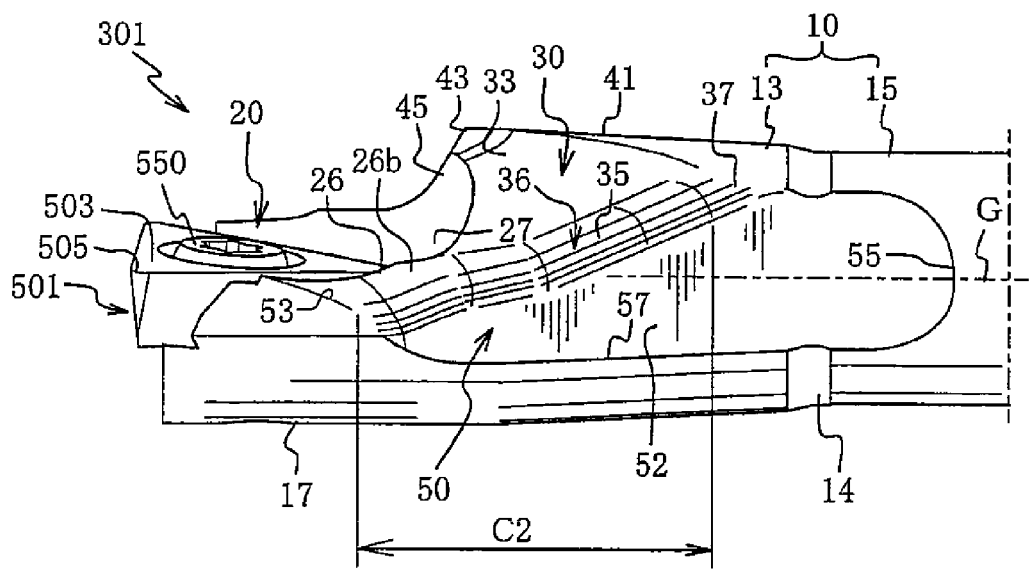
FIG. 16 is a view of FIG. 14 as seen from the portion of outer circumferential surface where the cutting edge overhangs (the front relief side, in the direction of an arrow A1).
Figure 17:
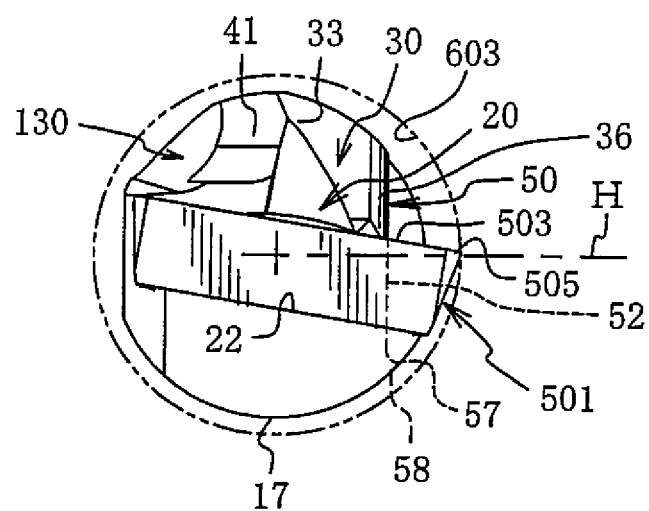
FIG. 17 is a left side view of FIG. 16.
Figure 18:
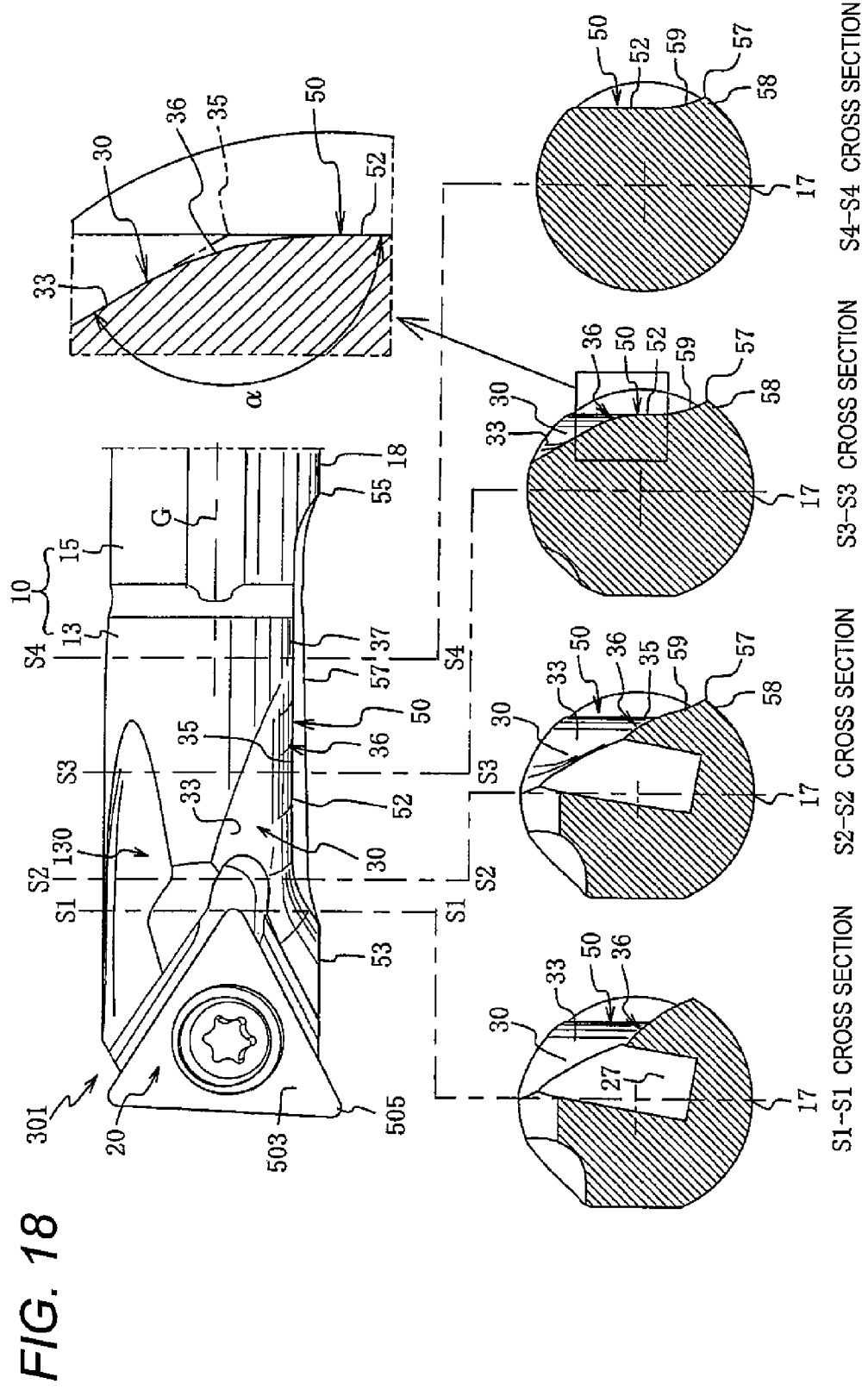
FIG. 18 is a view of the cutting tool for boring of FIG. 14, as seen from the cutting surface, and cross-sectional views of the parts at lines S1-S1, S2-S2, S3-S3 and S4-S4.

That is, on chip seat 21 in holder 10 of cutting tool 201 according to the present exemplary embodiment, as shown in FIG. 9, rhombus-shaped chip 701 is fixed. One (1) cutting edge (nose) 505 for cutting overhangs from the outer circumferential surface of the holder 10, as shown in FIGS. 8 to 12, such that the cutting surface 503 of chip 701 is positioned around a plane H (virtual plane) passing through axial line G of the holder 10 and the cutting edge 505 is positioned on plane H. Further, chip seat 21 is formed in a concaved shape in a notch shape in head 13.

Meanwhile, in the chip seat 21, two sides 510 at both sides of the overhung cutting edge 505 of rhombus-shaped chip 701 are positioned at the protrusion side and the front side of the outer circumferential surface of the holder 10. On the other hand, two restricting walls 23 and 24 restricting two sides (relief sides) 510 at both sides of the other cutting edge (nose) 505 not for cutting are raised from the seat surface 22 at an angle of five degrees in the direction of axial line G and the transverse direction of the holder 10, when viewed from the side of cutting surface 503. Therefore, the relief portion 27 receiving nose 505 is formed at a position corresponding to the position of the nose 505. Accordingly, the bottom surface of rhombus-shaped chip 701 is seated on the flat seat surface 22 of the chip seat 21, with two sides (relief sides) 510 in contact with the restricting walls 23 and 24, and then, in the same way as the previous embodiment, rhombus-shaped chip 701 is clamped by inserting clamp screw 550 in threaded hole 25 formed at the center portion of the seat surface 22. In the present exemplary embodiment, the head (top) of screw 550 slightly overhangs from cutting surface 503.

In the present exemplary embodiment, since the two restricting walls 23 and 24 are arranged as described above, when viewed from the side of cutting surface 503 (see FIG. 10), the portion of the restricting wall 24 opposite the side where the cutting edge 505 overhangs is relatively thin. Further, the cutting surface-sided chip pocket 30 is concaved rearward from upper edge 26 of the restricting wall 23 opposite the restricting wall 24. Further, the second cutting surface-sided chip pocket 130 has a cutting surface 29*b* inclined upward toward the rear side and extending rearward, with an upper edge 29 of restricting wall 24, which is opposite the side where the cutting edge 505 overhangs, at substantially the same height as the cutting surface 503.

The present exemplary embodiment is an example having a different cutting insert shape, that is, a modified example of the previous embodiment. As seen above, it is apparent from the present disclosure that the cutting tool can be used for cutting inserts having various chip shapes and can be appropriately modified. In each of the exemplary embodiments, although both pockets are formed such that the ridges rise where the bottom surface of the cutting surface-sided chip pocket and the surface of the cutting edge-sided chip pocket intersect, the cut chip can be easily removed to the cutting edge-sided chip pocket by chamfering the ridges in a predetermined size. In both embodiments, although flat surface 19 extending in a band shape with a predetermined width along the axial line is concaved on the side of the cutting surface of the shank, this is the fixing portion for fixing the cutting tool to an edge holder with a bolt.

Next, a cutting tool 301 for boring according to a third exemplary embodiment of the present disclosure is described with reference to FIGS. 14 to 18. However, as described above, although the ridges of holder 10 are formed where the bottom surface 33 of the cutting surface-sided chip pocket 30 and the surface (bottom surface) 52 of the cutting edge-sided chip pocket 50 intersect (at the edge 35 of the portion of the outer circumferential surface where the cutting edge overhangs on the bottom surface 33 of the cutting surface-sided chip pocket 30) in the first and second exemplary embodiments, a chamfered portion 36 is formed on the ridge in a predetermined size and cross-sectional shape in the present exemplary embodiment (third exemplary embodiment). The present exemplary embodiment is not different from the first exemplary embodiment, except for the chamfered portion 36 on the ridge (edge 35). Therefore, only this difference is described. The same parts are designated by the same reference numerals and the detailed description is omitted.

That is, in cutting tool 301 for boring of the present exemplary embodiment, chamfered portion 36 is formed throughout the entire length C2 along axial line G, where the bottom surface 33 of cutting surface-sided chip pocket 30 and the bottom surface 52 (surface) of the cutting edge-sided chip pocket 50 intersects in the holder 10, that is, where the ridge (end edge 35) extends in the holder 10 in the first exemplary embodiment. In the present exemplary embodiment, chamfered portion 36 is formed in a convex arc shape (convex rounded portion), on the cross-section (transverse surface) perpendicular to the axial line G of holder 10 (see FIG. 18). In detail, the cutting surface-sided chip pocket 30 has one (1) bottom surface 33, and the cutting edge-sided chip pocket 50 also has one (1) surface (bottom surface) 52, and the bottom surfaces 33 and 52 of both pockets 30 and 50 intersect in the first exemplary embodiment, such that the ridge is formed at the edge 35 at the intersection. However, in the present exemplary embodiment, chamfered portion 36 of the convex rounded portion (arc-shaped curved convex rounded portion) on the cross-section perpendicular to axial line G of holder 10 is formed throughout the entire length C2, along where the ridge is formed (edge 35). As shown in the enlarged view of the cross-section taken along the line S3-S3 in FIG. 18, the intersection angle α where the ridge (the edge 35 is shown by a chain line) is formed in the first exemplary embodiment, that is, where bottom surface 33 of the cutting surface-sided chip pocket 30 and the bottom surface 52 of cutting edge-sided chip pocket 50 intersect, is larger than 90 degrees. Further, since the convex rounded chamfered portion 36 will be formed at the ridge (edge 35), the bottom surface 33 of the cutting surface-sided chip pocket 30 and bottom surface 52 of cutting edge-sided chip pocket 50 are smoothly connected by the chamfered portion 36.

Further, in the present exemplary embodiment, chamfered portion 36 is formed in a range C2 from the front end 53 of the cutting edge-sided chip pocket 50 to the rear end 37 of the cutting surface-sided chip pocket 30. In the present exemplary embodiment, as described above, a ridge is not formed where the bottom surfaces 33 and 52 of both pockets 30 and 50 intersect, that is, both bottom surfaces 33 and 52 are connected by the rounded surface. Therefore, when the inner circumferential surface 603 of a hole of a workpiece is machined by cutting tool 301 for boring, since chamfered portion 36 is formed, even if inner circumferential surface 603 of the hole of the workpiece is close to the side of the outer circumferential surface where the cutting surface-sided chip pocket 30 and the cutting edge-sided chip pocket 50 are formed between the inner circumferential surface and the outer circumferential surface, there is no corner due to the ridge connecting from the cutting surface-sided chip pocket 30 to the cutting edge-sided chip pocket 50, other than the circumferential gap (cut chip discharging route) around the ridge in the first exemplary embodiment, such that the gap is large (wide). Therefore, the cut chip can smoothly flow from cutting surface-sided chip pocket 30 to the cutting edge-sided chip pocket 50.

By forming the chamfered portion 36, as described above, as the chamfered portion 36 (radius of the convex rounded portion) increases, there is no clear boundary between the bottom surface 33 of cutting surface-sided chip pocket 30 and the bottom surface 52 of cutting edge-sided chip pocket 50. That is, so to speak, both pockets 30 and 50 make one (1) chip pocket. Further, in the present exemplary embodiment, although the chamfered portion 36 is formed in a convex rounded shape on the cross-section perpendicular to axial line G of holder 10, it may be an inclined chamfered portion.

Figure 19:
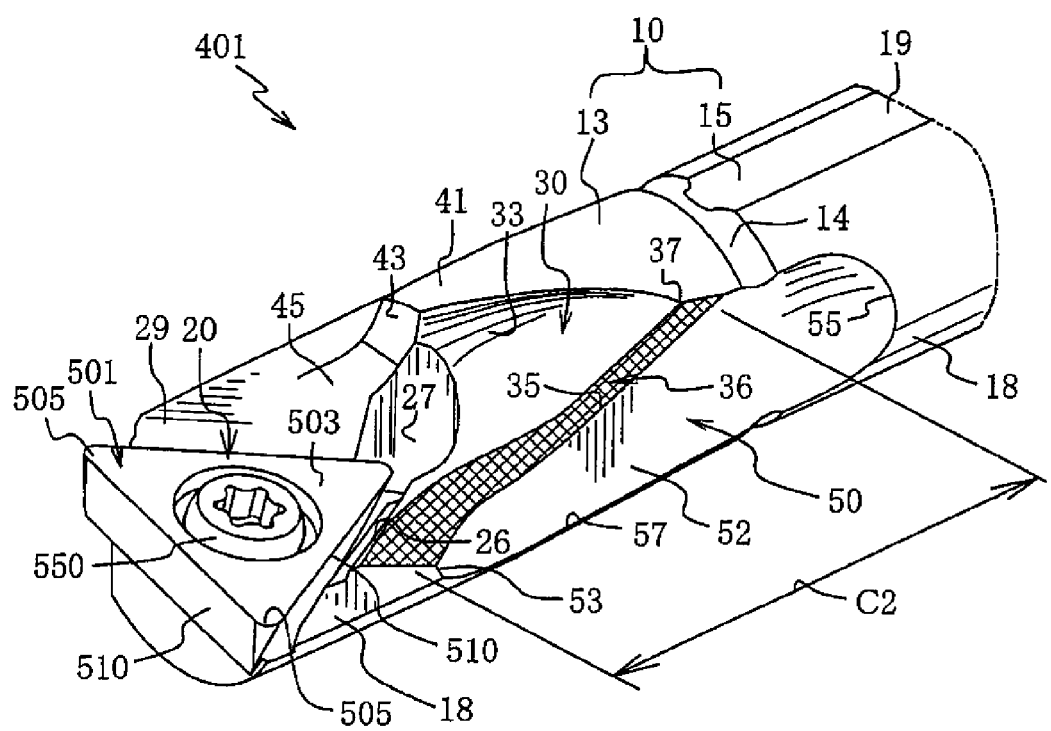
FIG. 19 is a perspective view of the main parts of a cutting tool for boring according to a fourth exemplary embodiment of the present invention, as seen from above a front end incline (cutting surface).

FIG. 19 is a view showing an example (fourth exemplary embodiment) of a cutting tool 401 for boring having an inclined chamfered portion, as shown by the double hatch lines. The present exemplary embodiment is different from the third exemplary embodiment only in the shape and structure of the chamfered portions. Further, the same parts are designated by the same reference numerals, such that the detailed description is omitted. However, when chamfered portion 36 is an inclined chamfered portion as in the present exemplary embodiment, machining for forming the chamfered portion becomes easy. The inclined chamfered portion may be a 45 degree chamfered portion 36 formed by cutting the portion close to the end of the cutting surface (end edge 35 in the first exemplary embodiment) of the bottom surface 52 of the cutting edge-sided chip pocket 50, at an angle of 45 degrees with respect to the bottom surface 52. However, it may be formed at less than 45 degrees with respect to the bottom surface 52 such that both bottom surfaces 32 and 52 intersect at a substantially equivalent angle. Alternatively, the inclined chamfered portion may be a multi-stepped chamfered portion, such as a double chamfered portion (chamfered portion composed of two inclinations on the transverse cross-section). A concave rounded portion opposite the convex rounded portion may be provided, if needed. That is, there is no corner due to the ridge of the first exemplary embodiment by the chamfered portion, such that the cut chip is smoothly removed to the cutting edge-sided chip pocket 50. Although the size of the chamfered portion 36 depends on the inner diameter of the workpiece or the depth of the hole, the larger the size, the more the strength of the holder 10 is decreased. Thus, the size of the chamfered portion should be determined on the basis of the machining conditions or cutting conditions.

From the foregoing, it will be appreciated that various embodiments of the present invention have been described herein for purposes of illustration, and that various modifications may be made without departing from the scope and spirit of the claims appended hereto.

This application is based on and claims priority from Japanese Patent Application No. 2010-083025, filed on Mar. 31, 2010, and Japanese Patent Application No. 2011-027989, filed on Feb. 11, 2011, the disclosures of which are incorporated herein by reference in their entirety.

What is claimed is:
1. A cutting tool for boring, comprising:
a bar-shaped holder having a front end and a rear end; and
a cutting insert fixed at a front end of the holder, the cutting insert having an upper cutting surface and a cutting edge which overhangs from an outer circumferential surface of the holder,
wherein the holder includes:
a cutting surface-sided chip pocket that is concave with respect to the outer circumferential surface of the holder and comes into contact with a rear end of a cutting surface of the cutting insert, the cutting surface-sided chip pocket configured to open to a portion of the outer circumferential surface where the cutting edge overhangs, the cutting surface-sided chip pocket having a bottom surface that faces the same direction as a portion of the outer circumferential surface where the cutting edge overhangs, and
wherein a cutting edge-sided chip pocket that is concave with respect to the outer circumferential surface of the holder and having a bottom surface which intersects with the bottom surface of the cutting surface-sided chip pocket is formed at a rear end portion of the outer circumferential surface where the cutting edge overhangs,
wherein, as the bottom surface of the cutting surface-sided chip pocket extends toward the rear end of the holder, the bottom surface of the cutting surface-sided chip pocket extends toward the portion of the outer circumferential surface where the cutting edge overhangs, such that when viewed from the upper cutting surface, a depth of the cutting surface-sided chip pocket from an edge of the portion of the outer circumferential surface where the cutting edge overhangs decreases toward the rear end of the cutting surface-sided chip pocket,
wherein the cutting edge-sided chip pocket is at or below the cutting surface-sided chip pocket at each of lines perpendicular to an axial line of the holder where the cutting surface-sided chip pocket is formed when viewed from a side of the cutting tool for boring, and
wherein the cutting edge-sided chip pocket does not rise above the cutting surface-sided chip pocket when viewed from the side of the cutting tool for boring.
2. The cutting tool for boring as claimed in claim 1, wherein the cutting edge-sided chip pocket is formed such that the rear end of the cutting edge-sided chip pocket is behind the rear end of the cutting surface-sided chip pocket.
3. The cutting tool for boring as claimed in claim 1,
wherein an edge opposite the cutting surface-sided chip pocket in the cutting edge-sided chip pocket forms a protrusion that overhangs outside of the outer circumferential surface of the holder on a cross-section taken perpendicular to an axial line of the holder.

4. The cutting tool for boring as claimed in claim 1, wherein a concave portion of the cutting edge-sided chip pocket runs along an axial axis of the holder.

5. The cutting tool for boring as claimed in claim 1, wherein a chamfered portion is formed where the bottom surface of the cutting surface-sided chip pocket and the bottom surface of the cutting end-sided chip pocket intersect and where a ridge extending along the holder is formed.

6. The cutting tool for boring as claimed in claim 5, wherein the chamfered portion is formed in a convex arc-shaped curve on a cross-section taken perpendicular to an axial line of the holder.

7. The cutting tool for boring as claimed in claim 1, wherein an edge at a boundary of the cutting surface-sided chip pocket and the cutting edge-sided chip pocket rises above the upper cutting surface of the cutting insert as the edge extends toward the rear end of the holder when viewed from a side of the cutting tool for boring.

8. The cutting tool for boring as claimed in claim 1, wherein a depth of the cutting edge-sided chip pocket from the cutting edge when viewed from a side of the upper cutting surface is 15 to 30% of a diameter of the holder.

* * * * *